(12) United States Patent
McDonnell

(10) Patent No.: US 10,528,971 B2
(45) Date of Patent: Jan. 7, 2020

(54) MEASURING CALL CONVERSIONS FOR ADS USING AGGREGATED CALL LOG DATA

(71) Applicant: Google Inc., Mountain View, CA (US)

(72) Inventor: Philip McDonnell, Belmont, CA (US)

(73) Assignee: Google LLC, Mountain View, CA (US)

( * ) Notice: Subject to any disclaimer, the term of this patent is extended or adjusted under 35 U.S.C. 154(b) by 585 days.

(21) Appl. No.: 14/742,083

(22) Filed: Jun. 17, 2015

(65) Prior Publication Data

US 2016/0371720 A1    Dec. 22, 2016

(51) Int. Cl.
*G06Q 30/02*    (2012.01)

(52) U.S. Cl.
CPC .............. *G06Q 30/0242* (2013.01)

(58) Field of Classification Search
CPC ................................. G06Q 30/0242
USPC ........................................ 705/14.45
See application file for complete search history.

(56) References Cited

U.S. PATENT DOCUMENTS

| | | | |
|---|---|---|---|
| 8,442,862 B2 | 5/2013 | Lieberman et al. | |
| 8,510,157 B2 * | 8/2013 | Kothari ................. | G06Q 30/02 705/14.1 |
| 8,725,561 B1 | 5/2014 | Chatterjee et al. | |
| 2007/0038516 A1 | 2/2007 | Apple et al. | |
| 2007/0143182 A1 | 6/2007 | Faber et al. | |
| 2009/0240538 A1 | 9/2009 | Sweeney et al. | |
| 2009/0325547 A1 * | 12/2009 | Nath ................... | G06Q 10/0637 455/414.1 |
| 2011/0058660 A1 * | 3/2011 | Piratla ................... | G06Q 10/06 379/134 |
| 2014/0052528 A1 * | 2/2014 | Lieberman ............. | G06Q 30/02 705/14.45 |

FOREIGN PATENT DOCUMENTS

WO    WO-2013/070687 A1    5/2013

OTHER PUBLICATIONS

International Search Report and Written Opinion on PCT/US2016/033911 dated Aug. 18, 2016.
Communication Pursuant to Article 94(3) dated Jun. 18, 2018.
Anonymous: "Facebook for Business", Aug. 14, 2014.
Anonymous: "Multi-Channel: Estimated Conversions Updated | Point It", Oct. 31, 2013.
Foreign Action other than Search Report on EP 16727096.6 dated Jul. 5, 2019.

* cited by examiner

*Primary Examiner* — Azam A Ansari
(74) *Attorney, Agent, or Firm* — Foley & Lardner LLP

(57) ABSTRACT

Systems and methods of estimating call conversion rates are described herein. The system can include a conversion tracker, which can receive, from a client device, an identification of a conversion event at a first time. The conversion event can be associated with a content item, content item provider, and phone number of a content item provider. The conversion tracker can transmit a request that can include the identification of the conversion event. Once received, the client device can scan the call log for the phone number and send an response indicating the phone number's existence. The conversion tracker can determine a time window in which the client device called the content provider. The conversion tracker can also aggregate the responses across multiple client devices to estimate the call conversion rate for the content item associated with the content provider.

14 Claims, 6 Drawing Sheets

225

| TIME STAMP | PHONE NUMBER |
|---|---|
| 5/4/2015 09:30 | 555-555-ABCD |
| 5/4/2015 10:45 | 555-555-CDAB |
| 5/4/2015 15:18 | 555-555-BACD |
| 5/4/2015 15:19 | 555-555-AAAA |
| 5/4/2015 18:07 | 555-555-CBBA |
| 5/5/2015 00:07 | 555-555-ABBD |
| 5/5/2015 08:57 | 555-555-BCCA |
| 5/5/2015 11:23 | 555-555-ACBA |
| 5/5/2015 14:32 | 555-555-BBBC |

T0 305 ↓ (pointing to 5/4/2015 15:18 row)

T1 310 ↓ (pointing to 5/5/2015 08:57 row)

FIG. 3

MEASURING CALL CONVERSIONS FOR ADS USING AGGREGATED CALL LOG DATA

BACKGROUND

In a computer networked environment such as the Internet, entities such as people or companies provide information for public display on web pages or other online documents. The documents can include information provided by the entities via a computing device for display on the Internet. Content can also be provided by third parties for display on the documents together with the information provided by the entities. Thus, a person viewing a document can access the information that is the subject of the document, as well as third party content that may or may not be related to the subject matter of the document.

SUMMARY

The present disclosure is directed to systems and methods for measuring call conversion rates for content items using call log data aggregated across a population of client devices that have call capability such as mobile smartphones. In response to determining that a conversion event (e.g., click on a content item such as a banner ad) occurred on a client device, a remote device (e.g., server) can ping or request the client device to determine whether the client device called the phone number associated with the content item. In one implementation, the remote device can determine other client devices that are associated with the original client device on which the conversion event occurred, and send the request instead to one of those associated client devices. The call log on a client device then may be scanned for entries corresponding with phone calls to content providers. The scanning and identification of such entries can be performed by the client device, thereby protecting the user's privacy. Using the responses aggregated across client devices, the remote device can extrapolate or determine the call conversion rate for the content provider. The present disclosure thereby solves the difficulties associated with tracking call conversion rates in connection with content items presentations over the Internet.

At least one aspect is directed to a method of estimating call conversions using call log data. The method can include receiving an identification of a first conversion event by a client device at a first time. The first conversion event can be associated with a content item, a content provider, and a phone number of the content provider. The method can include transmitting, to the client device, a first log request comprising an identification of the phone number of the content provider, responsive to receiving the identification of the first conversion event. The method can include receiving, from the client device, a first log response indicating that the phone number of the content provider associated with the first conversion event exists in a call log of the client device. The method can include subsequently receiving an identification of a second conversion event by the client device at a second time. the second conversion event can be associated with the content item, the content provider, and the phone number of the content provider. The method can include transmitting, to the client device, a second log request comprising the identification of the phone number of the content provider, responsive to receiving the identification of the second conversion event. The method can include identifying a time window in which the client device called the phone number of the content provider.

In some implementations, the method can further include transmitting, to each of a first plurality of client devices, a log request comprising the identification of the phone number of the content provider, responsive to receiving the identification of a conversion event associated with the content item from said client device. The method can include receiving, from each of a subset of the first plurality of client devices, a log response indicating that the phone number of the content provider exists in a call log of the said client device.

In some implementations, the method can further include determining a call conversion rate for the content item based on a ratio of a number of the subset of the first plurality of client devices to a number of the first plurality of client devices. In some implementations, the method can further include receiving a number of presentations of the content item by a second plurality of client devices, the first plurality of client devices a subset of the second plurality of client devices. In some implementations, determining the call conversion rate can further include determining the call conversion rate based on a ratio of the number of the first plurality of client devices to a number of the second plurality of client devices.

In some implementations, the method can further include determining that a number of the subset of the first plurality of the client devices is below a threshold number. In some implementations, the method can further include determining, responsive to determining that the number of the subset of the first plurality of the client devices is below the threshold number, a call conversion rate for the content item based on an approximation function of the number of the subset of the first plurality of the client devices and a number of total presentations of the content item.

In some implementations, first log response and second log response may not include the phone number. In some implementations, the first log response may consist essentially of a negative identifier and the second log response may consist essentially of a positive identifier.

At least one aspect is directed to a method of obfuscating conversion information. The method can include receiving, from a conversion tracker executed on a remote device, a first log request comprising an identification of a phone number of a content provider. The first log request can be transmitted responsive to the remote device receiving an identification of a first conversion event by the client device at a first time. The first conversion event can be associated with a content item, the content provider, and the phone number of the content provider. The method can include determining, responsive to receiving the first log request, that access to a call log of the client device is allowed. The method can include searching, responsive to determining that access to the call log of the client device is allowed, the call log of the client device for the phone number of the content provider. The method can include transmitting, to the conversion tracker responsive to determining that access to the call log is allowed a first log response indicating that the phone number of the content provider associated with the first conversion event exists in the call log of the client device. The method can include subsequently receiving, by the client device from the conversion tracker, a second log request comprising the identification of the phone number of the content provider. The second log request can be transmitted responsive to the remote device receiving an identification of a second conversion event by the client device at a second time. The second conversion event can be associated with the content item, the content provider, and the phone number of the content provider. The method can include searching, responsive to receiving the second log request, a first portion of the call log of the client device comprising a record of calls made between the first time and the second time. The method can include transmitting, to the conversion tracker, a second log response indicating that the phone number of the content provider associated with the second conversion event does not exist in the call log of the client device.

In some implementations, the method can further include subsequently receiving, from the conversion tracker, a third log request comprising the identification of the phone number of the content provider. The third log request can be transmitted responsive to the remote device receiving an identification of a third conversion event by the client device at a third time. The third conversion event can be associated with the content item, the content provider, and the phone number of the content provider. The method can further include searching, responsive to receiving the third log request, a second portion of the call log of the client device comprising a record of calls made between the second time and the third time. The method can further include determining that the phone number of the content provider associated with the third conversion event exists in the second portion of the call log of the client device. The method can further include transmitting, to the conversion tracker, a third log response indicating that the phone number of the content provider associated with the third conversion event exists in the call log of the client device.

In some implementations, the method can further include recording, by the client device, a time at which each of the first and the second log request is received. In some implementations, searching the call log of the client device for the phone number of the content provider can further include searching the call log of the client device for the phone number of the content provider within a predetermined time window. In some implementations, transmitting the second log response indicating that the phone number of the content provider associated with the second conversion event does not exist in the call log of the client device can cause the conversion tracker to determine that the client device did not call the phone number of the content provider between the first time and the second time.

At least one aspect is directed to a system for estimating call conversions using call log data. The system can include a computing device that comprises a processor and network interface in communication with a first plurality of client devices, the processor configured to execute a conversion tracker. The conversion tracker can be configured to receive from a first client device of the first plurality of client devices an identification of a first conversion event at a first time. The first conversion event can be associated with a content item, a content provider, and a phone number of the content provider, the first client device maintaining a first call log. The conversion tracker can be configured to transmit, to the first client, device a first log request comprising an identification of the first conversion event, responsive to receiving the identification of the first conversion event. The conversion tracker can be configured to receive, from the first client device, a first log response indicating that the phone number of the content provider exists in the first call log of the first client device. The conversion tracker can be configured to subsequently receive an identification of a second conversion event by the first client device at a second time. The second conversion event can be associated with the content item, the content provider, and the phone number of the content provider. The conversion tracker can be configured to transmit, to the first client device, a second log request comprising an identification of the phone number of the content provider, responsive to receiving the identification of the second conversion event. The conversion tracker can be configured to receive, from the first client device, a second log response indicating that the phone number of the content provider does not exist in the call log of the first client device. The conversion tracker can be configured to identify a time window in which the first client device called the phone number of the content provider.

In some implementations, the conversion tracker can be further configured to receive from the first client device an indication that access to the call log of the first client device is allowed. The conversion tracker can be further configured to transmit the first log request, responsive to receiving the indication that access to the call log of the first client device is allowed.

In some implementations, the conversion tracker can be further configured to receive from a second client device of the first plurality of client devices an identification of a third conversion event at a third time. The third conversion event can be associated with the content item, the content provider, and the phone number of the content provider. The second client device can be distinct from the first client device. The conversion tracker can be further configured to determine that the first client device is associated with the second client device, responsive to receiving the identification of the third conversion event based on an account identifier received from the first client device and the second client device. The conversion tracker can be further configured to transmit the second log request to the first client device, responsive to the determination that the first client device is associated with the second client device.

In some implementations, the content tracker can be further configured to receive an identification of a conversion event associated with the content item from said client device. The conversion tracker can be further configured to transmit to each of the first plurality of client devices a log request comprising an identification of the phone number of the content provider, responsive to receiving the identification of the conversion event associated with the content item from said client device.

In some implementations, the conversion tracker can be further configured to determine a call conversion rate for the content item based on a ratio of a number of the subset of the first plurality of client devices to a number of the first plurality of client devices. The conversion tracker can be further configured to receive a number of presentations of the content item by a second plurality of client devices, the first plurality of client devices a subset of the second plurality of client devices. The conversion tracker can be further configured to determine the call conversion rate based on a ratio of the number of the first plurality of client devices to a number of the second plurality of client devices.

In some implementations, the conversion tracker can be further configured to determine that a number of the subset of the first plurality of client devices is below a threshold. The conversion tracker can be further configured to, responsive to determining that the number of the subset of the first plurality of the client devices is below the threshold number, determine a call conversion rate for the content item based on an approximation function of the number of the subset of the first plurality of the client devices and a number of total presentations of the content item.

In some implementations the conversion tracker is further configured to determine the call conversion rate based on a weighted ratio of a number of the subset of the first plurality of client devices to a number of the first plurality of client devices. The weight can be based on a predetermined range of a plurality of predetermined ranges that can include the number of the subset of the first plurality client devices.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is a table including call log entries of a communication device, according to an illustrative implementation;

DETAILED DESCRIPTION

Figure 1:
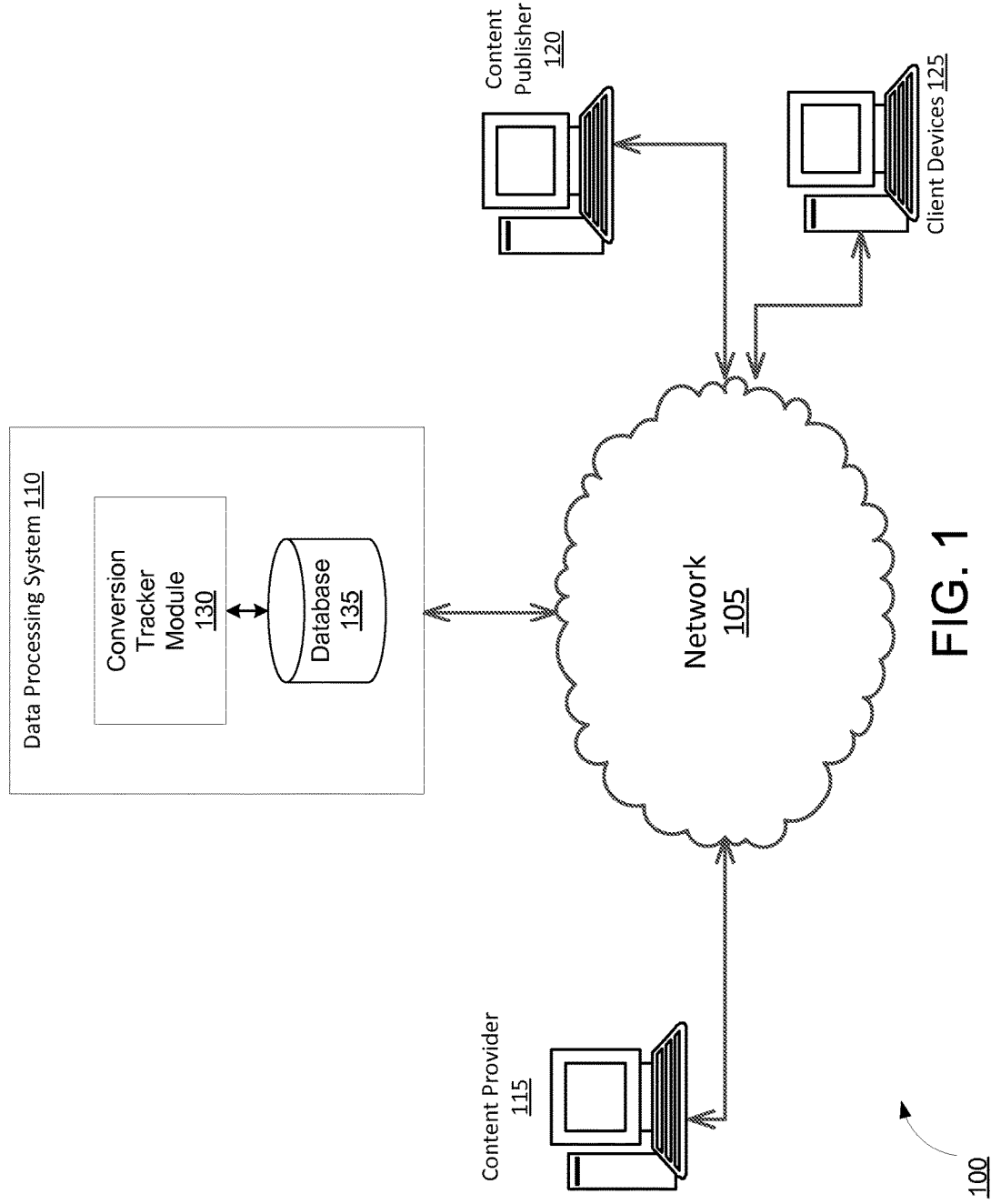
FIG. 1 is a block diagram depicting an environment for estimating call conversions using call log data of communication devices in a computer network environment, according to an illustrative implementation.

Systems and methods of the present disclosure relate generally to estimating call conversion rates using call log data on communication devices. The various concepts introduced above and discussed in greater detail below may be implemented in any numerous ways, as the described concepts are not limited to any particular manner of implementation.

Advertisements, such as those displayed on web pages, in banner advertisements, on television, in interstitial videos, or elsewhere, frequently include phone numbers as contact methods for consumers. Tracking the rate at which consumers call these numbers, or "call conversions" for the advertisement, may be difficult, particularly as the advertisement may be viewed on a different device than the consumer uses to call the number. In one attempt to provide tracking of call conversions, a system can provide advertisers with a "virtual" phone number that may be included in an advertisement. Calls to the virtual phone number are forwarded to an appropriate real number. As the system provides both the ad and the call forwarding, cookies can be used to track consumer actions. However, changing phone numbers in advertisements may be difficult or expensive for advertisers, reducing adoption of the virtual number method. Similarly, many advertisers have custom phone numbers with letters that correspond to easy to remember words that relate to their business (e.g., "1-800-[Business name]"), and who may not wish to have a randomly generated virtual phone number appear in their advertisement.

Instead, by accessing a call log on a user's smart phone (once granted permission by the user), the log may be scanned for entries corresponding to outgoing calls to advertisers. The scanning and identification may be performed on the user's phone, so that no information for non-advertiser calls is provided to a conversion tracking system, protecting the user's privacy. Specifically, in one implementation, an advertisement may be provided to a user on any device on which the user is logged in (e.g. smart phone, desktop computer, tablet, game console, smart TV, etc.). The presentation and/or a user click or other selection of the advertisement may be associated with a unique identifier. A log request may be sent by the conversion tracking system to the user's smart phone (as well as other devices capable of making calls), the request including a phone number present in the advertisement and, in some implementations, the unique identifier. The user's smart phone may review an outgoing call log to identify any calls made to the identified phone number, and may transmit a corresponding log response. In some implementations, the response may include the number, the unique identifier, the time or times the call was placed, the duration of the call, etc., while in other implementations, only a subset of this information may be provided in the response.

In some implementations, to further protect the user's privacy, only limited data may be provided to the conversion tracking system in the response message. For example, in one such implementation, the smart phone may determine if the outgoing call log includes the identified phone number, and may respond simply "yes" or "no" or with a similar indicator (e.g. predetermined bit or flag in a response, or any other similar indicator). The conversion tracking system may associate the response with the most recent presentation or click of the ad via the unique identifier, inferring that the call was made responsive to viewing that ad. In a similar implementation, the smart phone may determine if the outgoing call log includes the identified number during a time period since the last time the smart phone received a log request for that number, allowing disambiguation to specific presentations of the ad on the client side. In another implementation, the smart phone may determine if the outgoing call log includes the identified number during a past predetermined time period (e.g. one hour, one day, etc.).

The conversion tracking system may be used to extrapolate a call conversion rate for the advertisement. Given the total number of presentations (P) of the advertisements, the number of logged-in user devices (U) who have allowed call log access, and the number of user devices who respond positively to a log request for a corresponding phone number or numbers (Y), the ratio Y/U may be multiplied by P to identify the likely number (N) of total phone calls resulting from presentation of the advertisement.

FIG. 1 is a block diagram depicting an environment for estimating call conversion rates using call log data on communication devices in a computer network environment, according to one illustrative implementation. The environment 100 includes at least one data processing system 110. Although only one data processing system 110 is illustrated, in many implementations, data processing system 110 may be a farm, cloud, cluster, or other grouping of multiple data processing systems or computing devices. The data processing system 110 can include at least one processor and a memory, sometimes referred to as a processing circuit, each of which are discussed in more detail below in connection with FIG. 5. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system 110 can include one or more computing devices or servers that can perform various functions. In some implementations, the data processing system 110 can include an advertising auction system configured to host auctions. In some implementations, the data processing system 110 does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. The network 105 may be any form of computer network that relays information between the user computing device 115, data processing system 110, and one or more content sources, for example, web servers, advertising servers, among others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the client device 125. The content provided by the content provider computing device 115 can include third party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of ads or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The client devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client device 125, the content provider computing device 115, and the content publisher computing device 120 can include desktop computers, laptop computers, tablet computers, wearable computers, smartphones, personal digital assistants, mobile devices, consumer computing devices, servers, clients, digital video recorders, a set-top box for a television, a video game console, or any other computing device configured to communicate via the network 105. The client devices 125 can be communication devices through which an end user can submit requests to receive content. The requests can be requests to a search engine and the requests can include search queries. In some implementations, the requests can include a request to access a web page.

The content provider computing devices 115, the content publisher computing device 120, and the client devices 125 can include a processor and a memory or a processing circuit as discussed above and as discussed in more detail in connection with FIG. 5. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the client devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the client devices 125 (e.g., a built-in display, microphone, etc.) or external to the housing of content provider computing devices 115, the content publisher computing device 120 and the client devices 125 (e.g., a monitor connected to the user computing device 115, a speaker connected to the user computing device 115, etc.), according to various implementations. For example, the content provider computing devices 115, the content publisher computing device 120 and the client devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one conversion tracker module 130. The conversion tracker module 130 can include at least one processing unit, server, virtual server, circuit, engine, agent, appliance, or other logic device such as programmable logic arrays configured to communicate with the database 135 and with other computing devices (e.g., the content provider computing device 115, the content publisher computing device 120, or the client device 125) via the network 105. The data processing system 110 can also include one or more content repositories or databases 135. The databases 135 can be local to the data processing system 110. In some implementations, the databases 135 can be remote to the data processing system 110 but can communicate with the data processing system 110 via the network 105.

Figure 2:
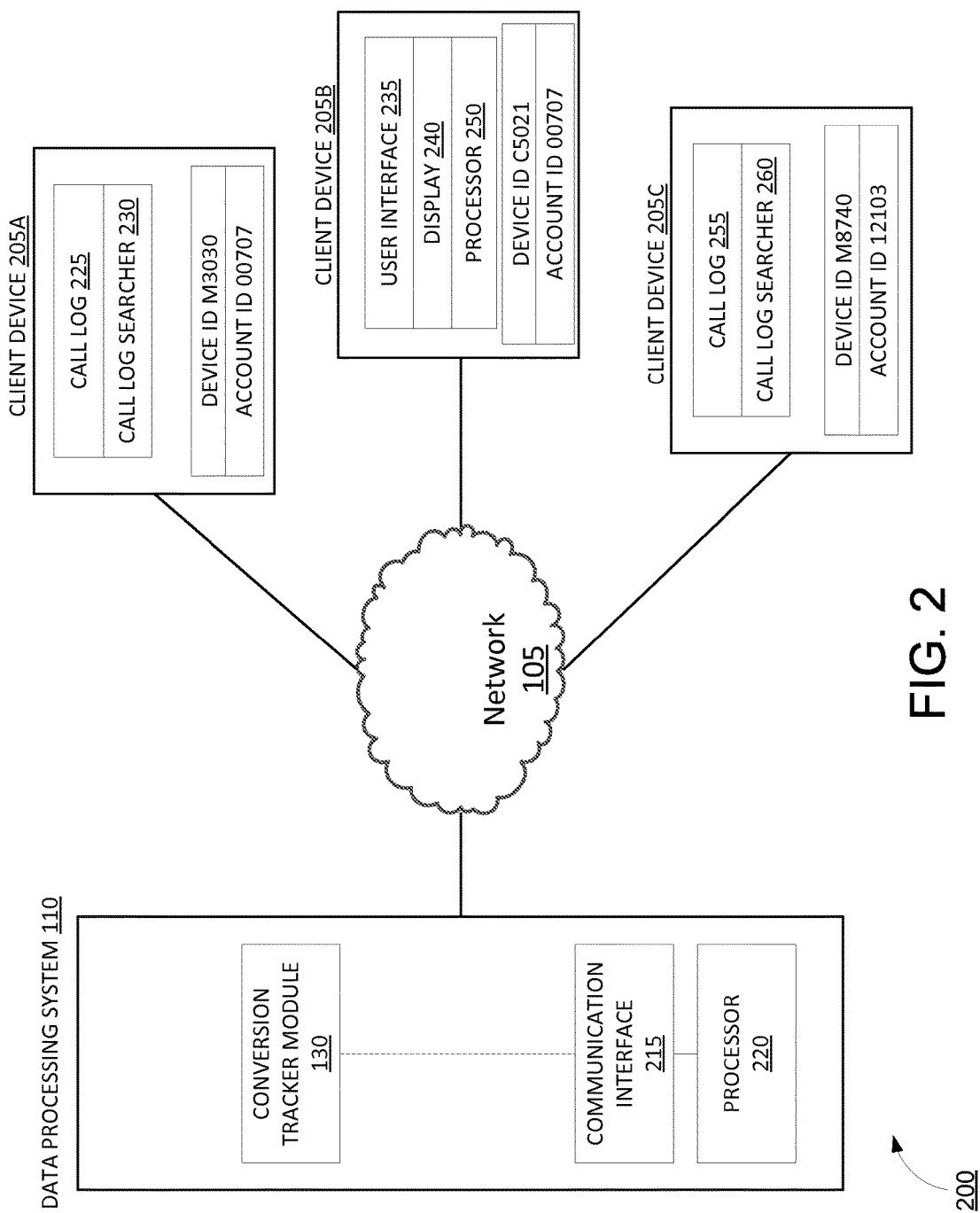
FIG. 2 is a block diagram depicting an environment for estimating call conversions using call log data of communication devices in a computer network environment, according to an illustrative implementation.

FIG. 2 is a block diagram depicting an environment for estimating call conversions using call log data of communication devices in a computer network environment, according to an illustrative implementation. The environment 200 can include the network 105, data processing system 110, and client devices 205A-205C. The client devices 205A-205C can correspond to the client devices 125 of FIG. 1. The client devices 205A-205C can be connected to the data processing system 110 via the network 105. Client devices 205A and 205C can include smart phones or any other device with capability of making calls or connecting with the network 105. Client device 205B can include desktop computers, laptop computers, tablet computers, personal digital assistants, mobile devices, consumer computing devices, servers, clients, digital video recorders, a set-top box for a television, a video game console, or any other computing device capable of connecting with the network 105. Each of the client devices 205A-205C can have an associated device identifier and an account identifier. For example, as depicted in FIG. 2, client device 205A can have the device identifier of "M3030" and the account identifier of "00707"; client device 205B can have the device identifier of "C5021" and account identifier of "00707" (sharing the account identifier with client device 205A); and client device 205C can have the device identifier of "M8740" and account identifier of "12103." Device identifiers may be unique in many implementations, or may be unique for devices within a class or type of device (e.g. tablet computers of a certain brand). In some implementations, device identifiers may comprise or be based off a media access control (MAC) address of the device. Client device 205A and 205C may each have call capabilities and can have a call log 225 and 255 and call log searcher 230 and 260. Client device 205B may not have call capabilities and can have a user interface 235, display 240, and processor 250. Processors 220 and 250 and communication interface 215 are described in further detail in relation to FIG. 5 below.

The conversion tracker module 130 can receive an identification of a conversion event from any one of the client devices 205A-205C. In some implementations, any one of the client devices 205A-205C can transmit an identification of a conversion event to the conversion tracker module 130. The conversion event can include, for example, display or playback of a content item (e.g., an online ad), a click on the content item, click on a click-to-call request on the content item, mouse hover-over the content item, or request for a landing page associated with the content item. Upon the occurrence of the conversion event, any one of the client devices 205A-205C can generate a conversion identification for the conversion event. The identification of the conversion event can be associated with a content item, content provider 115, and a phone number of the content provider 115. In some implementations, any one of the client devices 205A-205C can also transmit the phone number of the content provider 115 to the conversion tracker module 130. In some implementations, the conversion tracker module 130 can determine the conversion event has occurred, responsive to a request from the client device or a content provider 115 or content publisher 120. For example, the conversion tracker module 130 can receive a request from a client device 205A-205C for a website. The request can be initiated responsive to a user selection of the content item. Accordingly, in this example, the conversion tracker module 130 can determine that a conversion event has occurred implicitly, rather than receiving explicit identifications from the client device.

Responsive to receiving the identification of the conversion event from one of the client devices 205A-205C or detecting or inferring the conversion event, the conversion tracker module 130 can transmit a log request to any one of the client devices 205A-205C. The log request can include an identification of the received conversion event, identification of the phone number of the content provider, or the phone number of the content provider. For example, suppose the conversion tracker module 130 receives an identification of the conversion event, such as "E41380." The conversion tracker module 130 can determine the content item, content provider 115, and the phone number of the content provider 115 associated with the identification of the conversion event. In some implementations, the conversion tracker module 130 can access the database 135 for a listing of content items with the associated content provider 115 and identifier of the phone number of the content provider 115. Continuing the above example, by accessing the database 135, the conversion tracker module 130 can determine that the received identification of the conversion event "E41380" is associated with the content provider "XYZ, Inc." and further determine that the identification of the phone number of the content provider is "PP-12244" and the phone number of the content provider "XYZ, Inc." is "555-555-AAAA." The database 135 can be prepopulated with such identifications, or can be populated via information received in the identifications of conversion events. The conversion tracker module 130 can then transmit the log request that includes any one or more of the identification of the conversion event, "E41380," the content provider name "XYZ, Inc.," and the phone number of the content provider "555-555-ABCD" to the respective client device 205A-205C that transmitted the identification of the conversion event.

In some implementations, the conversion tracker module 130 can determine that one of the client devices 205A-205C is associated with another of the client devices 205A-205C. In some implementations, the conversion tracker module 130 can determine the association of one of the client devices 205A-205C with another of the client devices 205A-205C based the device identifier 205A-205C received with the identifier of the conversion event. For example, as depicted in FIG. 2, the device identifier of client device 205A is "M3030," the device identifier of client device 205B is "C5021," and the device identifier of client device 205C is "M8740." Furthermore, suppose that the account identifier of the first client device is "00707," the account identifier of the second device is "00707," and the account identifier of the third device is "12103." Also suppose that client device 205A transmitted the identification of the conversion event and the device identifier to the conversion tracker module 130. The conversion tracker module 130 can access the database 135 to retrieve a list of device identifiers and the respective account identifier. In this example, the conversion tracker module 130 can determine that client device 205A is associated with client device 205B because of the identical account identifier (e.g. account id "00707"). Responsive to the determination that one of the client devices 205A-205C is associated with another of the client devices 205A-205C, the conversion tracker 130 can transmit the log request to the other client device 205A-205C.

Responsive to receiving the log request from the conversion tracker module 130, the client device 205A or 205C can determine that access to a call log 225 or 255 of the client device 205A or 205C is allowed. In some implementations, the client devices 205A-205C can prompt the user to determine whether access to a call log 225 or 255 of the client device 205A or 205C is allowed. For example, the client device 205A-205C can display a message box asking the user whether the conversion tracker module 130 may access the call log of the client device 205A-205C, and the user may select to allow or not allow access. In some implementations, the client device 205A-205C can transmit a response to the conversion tracker module 130 indicating that the access to the call log 225 or 255 of the client device 205A or 205C is not allowed. In some implementations, responsive to receiving the response indicating that access to the call log 225 or 255 of the client device 205A or 205C is not allowed, the conversion tracker module 130 can store the response in the database 135 and apply the access indication marker across the client devices 205A-205C with the same account identifier. For example, if the conversion tracker module 130 receives a response from client device 205A indicating that access to the call log 225 of the client device 205A is not allowed, the conversion tracker module 130 can apply the "no" access indication marker to the account identifier "00707."

Responsive to determining that access to the call log 225 or 255 of the client device 205A or 205C is allowed, the call log searcher 230 or 260 of the client device 205A or 205C can search the call log 225 or 255 of the client device 205A or 205C for the phone number of the content provider 115. In some implementations, the call log searcher 230 or 260 of the client device 205A or 205C can search the entirety of the call log 225 or 255 of the client device 205A or 205C for the phone number of the content provider 115. In some implementations, the call log searcher 230 or 260 of the client device 205A or 205C can search a recent portion of the call log 225 or 255 of the client device 205A or 205C for the phone number of the content provider 115, such the time from an hour prior the time of receiving the log request. In some implementations, the client device 205A or 205C can record the time at which the log request was received.

The conversion tracker module 130 can subsequently receive a log response from the client device 205A or 205C indicating whether the phone number of the content provider 115 associated with the conversion event exists in the call log 225 or 255 of the client device 205A or 205C. In some implementations, the client device 205A or 205C, responsive to determining that access to the call log 225 or 255 is allowed, can transmit to the conversion tracker module 130 the log response. The log response can indicate whether the phone number of the content provider 115 associated with the identifier of the conversion event exists in the call log 225 or 255 of the client device 205A or 205C. The log response can include a positive identifier indicating that the phone number of the content provider 115 associated with the identifier of the conversion event exists in the call log 225 or 255 of the client device 205A or 205C. The log response can include a negative identifier indicating that the phone number of the content provider 115 associated with the identifier of the conversion event does not exist in the call log 225 or 255 of the client device 205A or 205C, or does not exist in a recent portion of the call log 225 or 255. In some implementations, the log response may not include the phone number of the content provider 115.

The conversion tracker module 130 can receive an identification of another conversion event by any one of the client devices 205A-205C. In some implementations, any one of the client devices 205A-205C can transmit an identification of another conversion event to the conversion tracker module 130. The conversion event can include, for example, a click on a content item (e.g., an online ad), click on a click-to-call request on the content item, mouse hover-over the content item, or request for a landing page associated with the content item. Upon the occurrence of the conversion event, any one of the client devices 205A-205C can generate another conversion identification for the conversion event. The identification of the conversion event can be associated with a content item, content provider 115, and a phone number of the content provider 115. In some implementations, any one of the client devices 205A-205C can also transmit the phone number of the content provider 115 to the conversion tracker module 130.

Responsive to receiving the identification of the other conversion event from one of the client devices 205A-205C, the conversion tracker module 130 can transmit another log request to any one of the client devices 205A-205C. The other log request can include an identification of the received conversion event, identification of the phone number of the content provider, or the phone number of the content provider. For example, suppose the conversion tracker module 130 receives an identification of the conversion event, "N81723." The conversion tracker module 130 can determine the content item, content provider 115, and the phone number of the content provider 115 associated with the identification of the conversion event. In some implementations, the conversion tracker module 130 can access the database 135 for a listing of content item with the associated content provider 115 and the phone number of the content provider 115. Continuing the above example, by accessing the database 135, the conversion tracker module 130 can determine that the received identification of the conversion event "N81723" is associated with the content provider "XYZ, Inc.," and further determine that the identification of the phone number of the content provider is "PP-12244" and the phone number of the content provider "XYZ, Inc." is "555-555-AAAA." The conversion tracker module 130 can then transmit the other log request that includes any one or more of the identification of the conversion event, "N81723," the content provider name "XYZ, Inc.," and the phone number of the content provider "555-555-ABCD" to the respective client device 205A-205C that transmitted the identification of the conversion event.

In some implementations, conversion tracker module 130 can transmit the other log request to any one of the client devices 205A-205C associated with the respective client device 205A-205C that transmitted the identification of the other conversion event to the conversion tracker module 130. For example, suppose the client device 205B transmitted the identification of the other conversion event and a device identifier, "M3030," to the conversion tracker module 130. The conversion tracker module 130 can access the database 135 for a listing account identifiers associated with the device identifier "M3030." In this example, the conversion tracker module 130 can determine that client device 205B is associated with client device 205A based on their identical account identifiers, "00707." Responsive to determining that client device 205B is associated with client device 205A, the conversion tracker module 130 can transmit the other log request to client device 205A.

In some implementations, the conversion tracker module 130 can identify a device type of the client device 205A-205C associated with the other client device 205A-205C and determine which of the client devices 205A-205C to transmit the other log request based on the identified device type. For example, suppose that the conversion tracker module 130 has determined that client device 205A is associated with client device 205B based on the identical account identifiers. In some implementations, the conversion tracker module 130 can identify the device type of the client device 205A-205C based on a number of parameters, such as the device identifier. In this example, the conversion module 130 can identify that client device 205A is a mobile smartphone device capable of making telephone calls based on "M" in the device identifier "M3030." The conversion module 130 can identify that client device 205B is a desktop computer based on "C" in the device identifier. Based on determining that client device 205A is capable of calling, the conversion tracker module 130 can transmit the other log request to client device 205A.

Responsive to receiving the other log request from the conversion tracker module 130, the call log searcher 230 or 260 of the client device 205A or 205C can search the call log 225 or 255 of the client device 205A or 205C for the phone number of the content provider 115. In some implementations, the call log searcher 230 or 260 of the client device 205A or 205C can search the entirety of the call log 225 or 255 of the client device 205A or 205C for the phone number of the content provider 115. In some implementations, the call log searcher 230 or 260 of the client device 205A or 205C can search the entirety of the call log 225 or 255 of the client device 205A or 205C for the phone number of the content provider 115 up to the time of receiving the log request. In some implementations, the client device 205A or 205C can record the time at which the log request was received.

In some implementations, the call log searcher 230 or 260 of the client device 205A or 205C can search a portion of the call log 225 or 255. The portion of the call log 225 or 255 searched can include a record of calls made between the time of the previous log request and the current log request. For example, suppose that the client device 205A has transmitted an identification of another conversion event associated with content provider 115, "QRS, Inc." that has the phone number "555-555-ABBD." Responsive to receiving the current log request associated with the identification of the other conversion event, the call log searcher 230 of the client device 205A can search the call log 225 for record of calls made between the time of the previous log request and the current log request for the phone number "555-555-ABBD." Referring to FIG. 3, illustrated is a table including call log 225 entries of client device 205A, according to one implementation. Call log 225 can include a time stamp and phone number for each call made by the client device 205A. Call log 225 can further include pointers 305 and 310 that refer to the times at which the respective log request was received. Pointer 305 can indicate the time (T0) at which the previous log request was received from the conversion tracker module 130 (around May 4, 2015 at 15:18). Pointer 310 can indicate the time (T1) at which the current log request was received from the conversion tracker module 130 (around May 5, 2015 at 08:57). In this example, responsive to receiving the current log request from the conversion tracker module 130, the call log searcher 230 of client device 205A can search between T0 as indicated by pointer 305 and T1 as indicated by pointer 310 for the phone number "555-555-ABBD." Here, the call log searcher 230 of the client device 205A can find "555-555-ABBD" with the time stamp of May 5, 2015 at 00:07. The portion of the call log 225 or 255 searched can include a record of call made within a predetermined time window of the current log request. For example, referring to FIG. 3, the portion of the call log 225 or 255 searched can span from May 5, 2015 00:00 to the time of the current request T1 as indicated by the pointer 310.

In some implementations, the client device 205A can determine that the phone number of the content provider 115 does not exist in the portion of the call log device. For example, suppose that the client device 205A has transmitted an identification of another conversion event associated with content provider 115, "XYZ, Inc." instead that has the phone number "555-555-ABCD." Responsive to receiving the current log request associated with the identification of the other conversion event, the call log searcher 230 of the client device 205A can search the call log 225 for record of calls made between the time of the previous log request and the current log request for the phone number "555-555-ABCD." Referring to FIG. 3 again, although the client device 205A did make a phone call to the phone number "555-555-ABCD", the call was made prior to the previous log request at T0. The call log searcher 230 of the client device 205A can search for the phone number "555-555-ABCD" between T0 as indicated by pointer 305 and T1 as indicated by pointer 310. Continuing this example, based on the search, the call log searcher 230 of the client device 205A can determine that the client device 205A did not make a call to the phone number of the content provider 115, "XYZ, Inc." between T0 and T1, and transmit a log response indicating that the phone number of the content provider 115 does not exist on the call log 225, despite a record of the call existing in the log at a time prior to T0 as indicated by the pointer 305.

The conversion tracker module 130 can subsequently receive another log response from the client device 205A or 205C indicating whether the phone number of the content provider 115 associated with the conversion event exists in the call log 225 or 255 of the client device 205A or 205C. In some implementations, the client device 205A or 205C can transmit to the conversion tracker module 130 the other log response. The other log response can indicate whether the phone number of the content provider 115 associated with the identifier of the conversion event exists in the call log 225 or 225 of the client device 205A or 205C. The other log response can include a positive identifier indicating that the phone number of the content provider 115 associated with the identifier of the conversion event exists in the call log 225 or 225 of the client device 205A or 205C. The other log response can include a negative identifier indicating that the phone number of the content provider 115 associated with the identifier of the conversion event does not exist in the call log 225 or 225 of the client device 205A or 205C. In some implementations, the other log response may not include the phone number of the content provider 115.

The conversion tracker module 130 can identify a time window in which the client device 205A or 205C called the phone number of the content provider 115. In some implementations, the conversion tracker module 130 can identify a time window in which the client device 205A or 205C called the phone number of the content provider 115 based on the log responses received from the client devices 205A or 205C. For example, referring to FIG. 3, suppose that the client device 205A has transmitted an identification of another conversion event associated with content provider 115, "FGH, LLC." that has the phone number "555-555-CBBA." Further suppose that the conversion tracker module 130 has transmitted two log requests at T0 as indicated by the pointer 305 and T1 as indicated by the pointer 310 to the client device 205A, and has received a log response for T0 indicating that the phone number does not in the call log 225 of the client device 205A and another log response for T1 indicating the phone number exists in the call log 225 of the client device 205. Based on these two log responses, the conversion tracker module 130 can determine that the client device 205A called "FGH, LLC." between T0 and T1.

The conversion tracker module 130 can determine a call conversion ratio based on an aggregate of the call log data across client devices 125 for a particular content provider 115. In some implementations, the conversion tracker module 130 can transmit log requests to each of a plurality of client devices 125, responsive to receiving an identification of a conversion event associated with the content item from the respective client device 125. The log request can include an identification of the received conversion event, identification of the phone number of the content provider, or the phone number of the content provider 115. The conversion tracker module 130 can receive from each of a subset of the plurality of client devices 125, log responses indicating whether the phone number of the content provider 115 exists in the call log of the respective client device 125.

The conversion tracker module 130 can determine a call conversion rate for the content item based on a ratio of a number of the subset of the plurality of client devices 125 to a number of the plurality of client devices 125. In some implementations, the number of the subset of the plurality client devices 125 for the ratio can include the number of log responses indicating that the phone number of the content provider 115 exists in the call log of the respective client device 125. Using the ratio of the number of the subset of the plurality of client devices 125 to a number of plurality of client devices 125, the call conversion rate, for example, can be in the form:

$$N_i = \frac{Y}{U}$$

where $N_i$ is the call conversion rate for content provider 115 i, Y is the number of client devices 125 that called content provider 115 i, and U is the number of client devices that received log requests from conversion tracker module 130.

The conversion tracker module 130 can determine a call conversion rate for the content item based on a ratio of a number of the subset of the plurality of client devices 125 to a number of the plurality of client devices 125 and a multiplicative factor. The multiplicative factor can include, for example, a ratio of the number of the plurality of client devices 125 that received a log request to the number of plurality of client devices that received a presentation of the content item associated with the content provider 115. In some implementations, the conversion tracker module 130 can receive a number of presentations of the content item by another plurality of client devices 125'. For example, the conversion tracker module 130 can retrieve the number of presentations of the content item from the database 135, content provider 115, or any one or more components of system 100. The plurality of client devices 125 can be a subset of the other plurality of client devices 125'. Using the multiplicative factor, the call conversion ratio, for example, can be in the form:

$$N_i = \frac{Y}{U} * P$$

where $N_i$ is the call conversion rate for content provider 115 i, Y is the number of client devices 125 that called content provider 115 i, U is the number of client devices that received log requests from conversion tracker module 130, and P is the ratio of the number of the plurality of client devices 125 that received a log request to a ratio of the number of plurality of client devices that received a presentation of the content item associated with the content provider 115.

In some implementations, the conversion tracker module 130 can determine that the number of the plurality of client devices 125 that transmitted a log response is below a threshold number. The threshold number can be based on the ratio of the number of the plurality of client devices 125 that transmitted a log response indicating that the phone number of the content provider 115 exists on the call log of the respective client device 125 to the number of the plurality of client devices 125 that received a log request form the conversion tracker module 130, the ratio of the number of plurality of client devices 125 that transmitted a log response indicating that the phone number of the content provider 115 exists on the call log of the respective client device 125 to the number of the plurality of client devices 125 that received a presentation of the content item associated with the content provider 115, among others. For example, the threshold number can be 15% of the total number of the plurality of client devices that received a presentation of the content item associated with the content provider 115 that also allowed access to the call log of the client device 125.

In some implementations, responsive to determining that the number of the plurality of client devices 125 that transmitted a log response is below a threshold number, the conversion tracker module 130 can determine a call conversion rate for the content item based on an approximation function. The parameters of the approximation function can include a number of the plurality client devices 125 that transmitted a log response and number of total presentations of the content item associated with the content provider 115, among others. The approximation function, for example, can be in the form of a minimum norm solution:

$$\text{Min } \|\tilde{x}\|_l \text{ such that } \|A\tilde{x}-b\|_l < \in$$

where the double lined brackets denotes a norm function, b is the subset of the plurality of client devices 125 that transmitted a log response indicating that either the phone number of the content provider 115 exists or does not exist on the call log of the respective client device 125, $\tilde{x}$ is the estimate set of the plurality of client devices 125', A is some randomly distributed matrix, and $\in$ is some noise measure such as white noise. In this example, the sizes of A and $\tilde{x}$ can be larger than the size of b and be based on the number of total presentations of the content item associated with the content provider 115 to the plurality of client devices 125. The conversion tracker module 130 can generate a randomly distributed matrix A such as a normal distribution and determine a minimum norm solution for $\tilde{x}$ based on $L_P$ norms such L1 norm. Based on the minimum norm solution of $\tilde{x}$, the conversion tracker module 130 can determine an estimate for the call conversion rate for the number of total presentations of the content item associated with the content provider 115 to the plurality of client devices 125.

In some implementations, responsive to determining that the number of the plurality of client devices 125 that transmitted a log response is below a threshold number, the conversion tracker module 130 can determine a call conversion rate for the content item based on a weight. The weight can be based on a predetermined range of a plurality predetermined ranges, each defined by a ratio or percentage of the number of the plurality of client devices 125 that transmitted a log response indicating that the phone number of the content provider 115 exists on the call log of the respective client device 125 to the number of the plurality of client devices 125 that received a log request or a ratio or percentage of the number of the plurality of client devices 125 that transmitted a log response indicating that the phone number of the content provider 115 exists on the call log of the respective client device 125 to the total number of presentations of the content item associated with the content provider 115 to the plurality of client devices 125, among others. For example, the weight to apply to the call conversion rate can be 4.7 if the percentage between the number of the plurality of client devices 125 that transmitted a log response indicating that the phone number of the content provider 115 exists on the call log of the respective client device 125 to the total number of presentations of the content item associated with the content provider 115 to the plurality of client devices 125 is between 1.5-1.7%, but be 3.2 if the ratio is 1.7-2.5%. The weights to apply to the call conversion rate can also be based on previous empirical measurements of the call conversion rate for content associated with other content providers 115. Based on the weights and the predetermined ranges, The call conversion rate can be, for example, of the form:

$$N_i = \alpha \frac{Y}{U}$$

$$\alpha \triangleq \begin{cases} 8.5 & r < 0.05 \\ 4.4 & 0.05 \leq r < 0.3 \\ 1.6 & r \geq 0.3 \end{cases}$$

where $N_i$ is the call conversion rate for content provider 115 i, Y is the number of client devices 125 that called content provider 115 i, U is the number of client devices that received log requests from conversion tracker module 130, $\alpha$ is the weighted to apply to the call conversion rate, and r is the ratio of the number of the plurality of client devices 125 that transmitted a log response indicating that the phone number of the content provider 115 exists on the call log of the respective client device 125 to the number of the plurality of client devices 125 that received a log request.

Figure 4A:
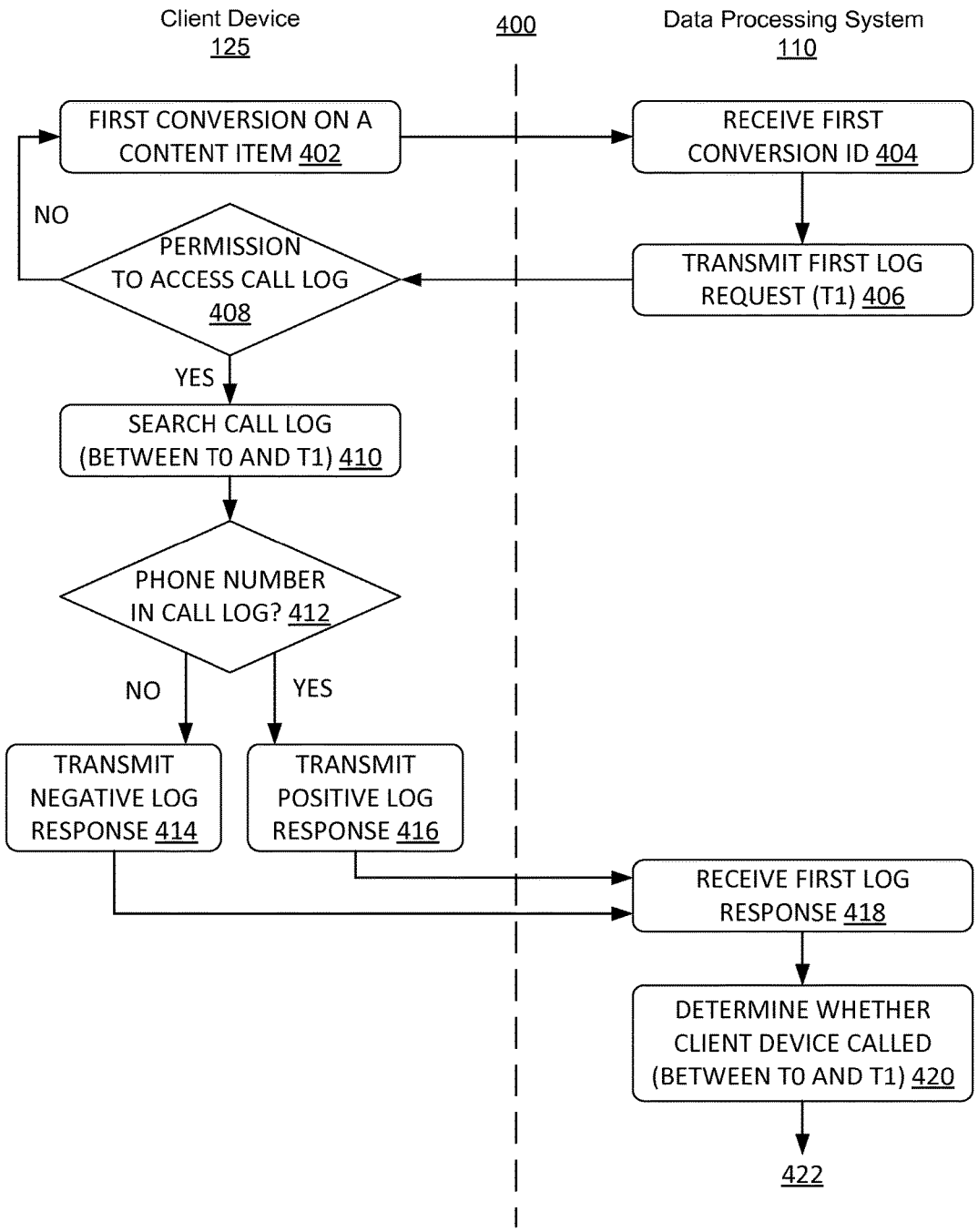
FIGS. 4A and 4B are flow diagrams depicting a method of estimating call conversion using call log data of communication devices in a computer network environment, according to an illustrative implementation.
Figure 4B:
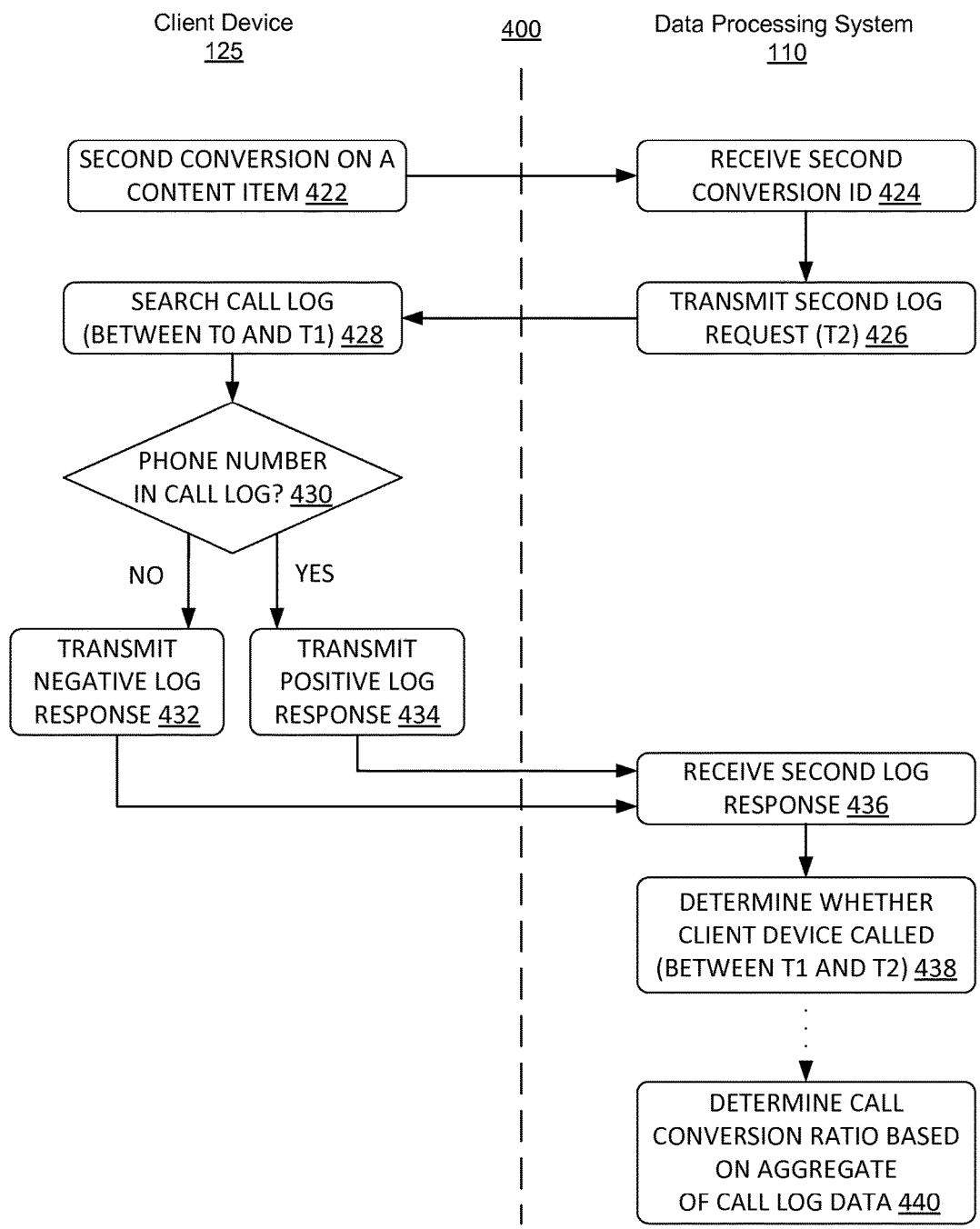

FIGS. 4A and 4B are flow diagrams depicting a method of estimating call conversion using call log data of communication devices in a computer network environment, according to an illustrative implementation. The functionality described herein described in the method 400 can be performed by the conversion tracker module 130, data processing system 110, call log searcher 230 or 260, client devices 125 or 205A-205C, or any one or more components of the system 100 shown in FIG. 1 or of system 200 in FIG. 2. Furthermore, the functionality described in method 400 can be repeated by the conversion tracker module 130, data processing system 110, call log searcher 230 or 260, client devices 125 or 205A-205C, or any one or more components of the system 100 shown in FIG. 1 or of system 200 in FIG. 2.

The client device can transmit an identification of a first conversion event to the data processing system, at step 402. The first conversion event can include, for example, display or playback of a content item (e.g., an online ad), a click on the content item, click on a click-to-call request on the content item, mouse hover-over the content item, or request for a landing page associated with the content item. Upon the occurrence of the first conversion event, the client device can generate a conversion identification for the conversion event. The identification of the first conversion event can be associated with a content item, content provider, and a phone number of the content provider. In some implementations, the client device can also transmit the phone number of the content provider to data processing system. In other implementations, the conversion identification may be implicit and not be explicitly generated or transmitted by the client device, as discussed below in connection with step 404.

The data processing system can receive an identification of the first conversion event, at step 404. The identification may be transmitted by the client device, in some implementations. In other implementations, the data processing system can determine that a conversion event has occurred, responsive to a request from the client device. For example, the data processing system can receive a request from a client device for a website. The request can be initiated responsive to a user selection of the content item. Accordingly, in this example, the data processing system can determine that a conversion event has occurred implicitly, rather than receiving explicit identifications from the client device. Implicit conversion identifications may be based on requests for content, the presence of cookies or other predetermined identifiers within requests, referrer tags, HTML pings, redirection requests, or other such information.

Responsive to receiving the identification of the first conversion event from the client device or detecting or inferring the first conversion event, the data processing system can transmit a first log request at T1 to the client device, at step 406. In some implementations, the first log request can include an identification of the received conversion event, identification of the phone number of the content provider, or the phone number of the content provider. For example, suppose the data processing system receives an identification of the conversion event "E41380." The data processing system can determine the content item, content provider, and the phone number of the content provider associated with the identification of the conversion event. In some implementations, the data processing system can access the database for a listing of content item with the associated content provider and identifier of the phone number of the content provider. Continuing the above example, by accessing the database, the data processing system can determine that the received identification of the conversion event "E41380" is associated with the content provider "XYZ, Inc." and further determine that the identification of the phone number of the content provider is "PP-12244" and the phone number of the content provider "XYZ, Inc." is "555-555-AAAA." The database can be prepopulated with such identifications, or can be populated via information received in identifications of conversion events. The data processing system can then transmit the log request that includes any one or more of the identification of the conversion event, "E41380," the content provider name "XYZ, Inc.," and the phone number of the content provider "555-555-ABCD" to the client device. In other implementations, the log request can include just the identification of the phone number of the content provider or a portion of the phone number or other such identifier.

In some implementations, the data processing system can determine that one client device is associated with another client device. In some implementations, the data processing system can determine the association of one client device with another client device based the device identifier received with the identifier of the conversion event. For example, suppose that the device identifier of first client device "M3030," the device identifier of the second client device is "C5021," and the device identifier of a third client device is "M8740." Furthermore, suppose that the account identifier of the first client device is "00707," the account identifier of the second device is "00707," and the account identifier of the third device is "12103." Also suppose that first client device transmitted the identification of the conversion event and the device identifier to the data processing system. The data processing system can access the database to retrieve a list of device identifiers and the respective account identifier. In this example, the data processing system can determine that first client device is associated with second device because of the identical account identifier (e.g. account id "00707"). Responsive to determining that one client device is associated with another client device, the data processing system can transmit the first log request to the other client device.

In some implementations, the data processing system can identify a device type of the client device associated with the other client and determine which of the client devices to transmit the first log request based on the identified device type. For example, suppose that the data processing has determined that a first client device with the device identifier "M3030" is associated with a second client device with the device identifier "C5021" based on the identical account identifiers. In some implementations, the data processing system can identify the device type of the client device based on a number of parameters, such as the device identifier. In this example, the data processing system can identify that client device is a mobile smartphone device capable of making telephone calls based on "M" in the device identifier "M3030." The data processing system can identify that the second client device is a desktop computer based on "C" in the device identifier. Based on determining that first client device is capable of calling, the data processing system can transmit the first log request to first client device, even if the conversion event is associated with the second client device.

Responsive to receiving the first log request, the client device can determine that access to the call log of the client device is allowed, at step 408. In some implementations, the client device can prompt the user to determine whether access to a call log of the client device allowed. For example, the client device can display a message box asking the user whether the data processing system may access the call log of the client device, and the user may select to allow or not allow access. In some implementations, the client device can transmit a response to the data processing system indicating that the access to the call log of the client device is not allowed. In some implementations, responsive to receiving the response indicating that access to the call log of the client device is not allowed, the data processing system can store the response in the database and apply the access indication marker across the client devices with the same account identifier. For example, if the data processing system receives a response from one client device associated with the account identifier "00707" indicating that access to the call log of the respective client device is not allowed, the data processing system can apply the "no" access indication marker to the account identifier "00707." In other implementations, a request for access to the call log may be presented to the user during installation of software on the client device. Accordingly, in such implementations at step 408, the client device can determine whether access permission has previously been granted.

Responsive to determining that access to the call log of the client device is allowed, the client device can search the call log of the client device for the phone number of the content provider between sometime T0 and the time the first log request was received at T1, at step 410. In some implementations, the client device can search the entirety of the call log of the client device for the phone number of the content provider. In some implementations, the client device can search a portion of the call log of the client device for the phone number of the content provider, such as from the current time up to the time of receiving the log request. In some implementations, the client device can record the time at which the log request was received.

Responsive to determining that access to the call log of the client device is allowed, the client device can determine whether the phone number of the content provider exists on the call log of the client device, at step 412. In some implementations, the client device can determine the phone number of the content provider associated with the identification of the first conversion event based on the identification of the phone number of the content provider included in the first log request. For example, the client device can store the identification of the phone number of the content provider in a list when instantiating the identification of the first conversion event. In this example, the client device can access this list to retrieve the phone number of the content provider associated with the identification of the phone number of the content provider. The client device can then search the call log for the phone number of the content provider.

Responsive to determining whether the phone number of the content provider exists on the call log of the client device, the client device can transmit to the data processing system the first log response, at steps 414 and 416. The first log response can indicate whether the phone number of the content provider associated with the identifier of the conversion event exists in the call log of the client device. The first log response can include a positive identifier indicating that the phone number of the content provider associated with the identifier of the conversion event exists in the call log of the client device. The first log response can include a negative identifier indicating that the phone number of the content provider associated with the identifier of the conversion event does not exist in the call log of the client device, or does not exist in a portion of the call log. In some implementations, the first log response may not include the phone number of the content provider.

The data processing system can subsequently receive the first log response from the client device, at act 418. Responsive to receiving the first log response from the client device, the data processing system can identify whether the client device called the phone number of the content provider between sometime T0 and the time the first log request was transmitted at T1, at step 420. In some implementations, the data processing system can identify an indefinite time window in which the client device called the phone number of the content provider based on the first log response received from the client device. For example, suppose that the client device has transmitted an identification of the first conversion event associated with content provider, "FGH, LLC." that has the phone number "555-555-CBBA." Further suppose that the data processing system subsequently received a first log response in response to the first log request at T1 from the client device indicating that the phone number of the content provider "FGH, LLC" exists on the call log of the client device. In this example, based on the log response and since there were no log responses before T0, the data processing system can determine that the client device called the content provider sometime before T1.

The client device can subsequently transmit an identification of a second conversion event to the data processing system, at step 422. The second conversion event can include, for example, display or playback of a content item (e.g., an online ad), a click on the content item, click on a click-to-call request on the content item, mouse hover-over the content item, or request for a landing page associated with the content item. upon the occurrence of the second conversion event, the client device can generate a conversion identification for the conversion event. The identification of the second conversion event can be associated with a content item, content provider, and a phone number of the content provider. In some implementations, the client device can also transmit the phone number of the content provider to data processing system.

The data processing system can subsequently receive an identification of the second conversion event, act 424. In some implementations, the data processing system can determine that a conversion event has occurred, responsive to a request from the client device. For example, the data processing system can receive a request from a client device for a website. The request can be initiated responsive to a user selection of the content item. Accordingly, in this example, the data processing system can determine that a conversion event has occurred implicitly, rather than receiving explicit identifications from the client device.

Responsive to receiving the identification of the second conversion event from the client device or detecting or inferring the second conversion event, the data processing system can transmit a second log request at T2 to the client device, at step 426. The second log request can include an identification of the received conversion event, identification of the phone number of the content provider, or the phone number of the content provider. For example, the data processing system can receive an identification of the conversion event, such as "N81723." The data processing system can determine the content item, content provider, and the phone number of the content provider associated with the identification of the conversion event. In some implementations, the data processing system can access the database for a listing of content item with the associated content provider and identifier of the phone number of the content provider. Continuing the above example, by accessing the database, the data processing system can determine that the received identification of the conversion event "N81723" is associated with the content provider "XYZ, Inc.," and further determine that the identification of the phone number of the content provider is "PP-12244" and the phone number of the content provider "XYZ, Inc." is "555-555-AAAA." The database can be prepopulated with such identifications, or can be populated via information received in identifications of conversion events. The data processing system can then transmit the log request that includes any one or more of the identification of the conversion event, "E41380," the content provider name "XYZ, Inc.," and the phone number of the content provider "555-555-ABCD" to the client device.

In some implementations, data processing system can determine that one client device is associated with another client device. In some implementations, the data processing system can determine the association of one client device with another client device based the device identifier received with the identifier of the conversion event. For example, suppose that the device identifier of first client device "M3030," the device identifier of the second client device is "C5021," and the device identifier of a third client device is "M8740." Furthermore, suppose that the account identifier of the first client device is "00707," the account identifier of the second device is "00707," and the account identifier of the third device is "12103." Also suppose that second client device transmitted the identification of the second conversion event and the device identifier to the data processing system. The data processing system can access the database to retrieve a list of device identifiers and the respective account identifier. In this example, the data processing system can determine that first client device is associated with second device because of the identical account identifier (e.g. account id "00707"). Responsive to determining that one client device is associated with another client device, the data processing system can transmit the second log request to the other client device.

In some implementations, the data processing system can identify a device type of the client device associated with the other client and determine which of the client devices to transmit the second log request based on the identified device type. For example, suppose that the data processing has determined that a first client device with the device identifier "M3030" is associated with a second client device with the device identifier "C5021" based on the identical account identifiers. In some implementations, the data processing system can identify the device type of the client device based on a number of parameters, such as the device identifier. In this example, the data processing system can identify that client device is a mobile smartphone device capable of making telephone calls based on "M" in the device identifier "M3030." The data processing system can identify that the second client device is a desktop computer based on "C" in the device identifier. Based on determining that first client device is capable of calling, the data processing system can transmit the second log request to first client device.

Responsive to receiving the second log request, the client device can search the call log of the client device for the phone number of the content provider between some time T1 and the time the second log request was received at T2, at step 428. In some implementations, the client device can search the entirety of the call log of the client device for the phone number of the content provider. In some implementations, the client device can search a portion of the call log of the client device for the phone number of the content provider, such as from an hour prior to receiving the log request. In some implementations, the client device can record the time at which the log request was received. In such implementations, the client device can search the portion of the call log of the client device between the previous time that was recorded and the time the second log request was received at T2.

Responsive to determining that access to the call log of the client device is allowed, the client device can determine whether the phone number of the content provider exists on the call log of the client device, at step 430. In some implementations, the client device can determine the phone number of the content provider associated with the identification of the second conversion event based on the identification of the phone number of the content provider included in the second log request. For example, the client device can store the identification of the phone number of the content provider in a list when instantiating the identification of the second conversion event. In this example, the client device can access this list to retrieve the phone number of the content provider associated with the identification of the phone number of the content provider. The client device can then search the call log for the phone number of the content provider.

Responsive to determining whether the phone number of the content provider exists on the call log of the client device, the client device can transmit to the data processing system the second log response, at steps 432 and 434. The second log response can indicate whether the phone number of the content provider associated with the identifier of the conversion event exists in the call log of the client device. The second log response can include a positive identifier indicating that the phone number of the content provider associated with the identifier of the conversion event exists in the call log of the client device. The second log response can include a negative identifier indicating that the phone number of the content provider associated with the identifier of the conversion event does not exist in the call log of the client device, or does not exist in a portion of the call log. In some implementations, the second log response may not include the phone number of the content provider.

The data processing system can subsequently receive the second log response from the client device, at step 436. Responsive to receiving the second log response from the client device, the data processing system can identify whether the client device called the phone number of the content provider between the time at which the first log request was transmitted T1 and the time at which the second log request was transmitted at T2, at step 438. In some implementations, the data processing system can identify a time window in which the client device called the phone number of the content provider based on the second log response received from the client device. For example, suppose that the client device has transmitted an identification of the second conversion event associated with content provider, "FGH, LLC." that has the phone number "555-555-CBBA." Furthermore, suppose that the data processing system has received a first log response at T1 indicating that the phone number of the content provider does not exist on the call log of the client device and a second log response at T2 indicating that the phone number of the content provider exists on the call log of the client device. Based on the first and second log responses, the data processing system can determine that the client device called FGH, LLC between T1 and T2.

The data processing system can determine a call conversion ratio based on an aggregate of the call log data across client devices for a particular content provider, at step 440. In some implementations, the data processing system can transmit log requests to each of a plurality of client device, responsive to receiving an identification of a conversion event associated with the content item from the respective client device. The log request can include an identification of the received conversion event, identification of the phone number of the content provider, or the phone number of the content provider. The data processing system can receive from each of a subset of the plurality of client device, log responses indicating whether the phone number of the content provider exists in the call log of the respective client device.

The data processing system can determine a call conversion rate for the content item based on a ratio of a number of the subset of the plurality of client device to a number of the plurality of client device. In some implementations, the number of the subset of the plurality client device for the ratio can include the number of log responses indicating that the phone number of the content provider exists in the call log of the respective client device. Using the ratio of the number of the subset of the plurality of client device to a number of plurality of client device, the call conversion rate, for example, can be in the form:

$$N_i = \frac{Y}{U}$$

where $N_i$ is the call conversion rate for content provider i, Y is the number of client device that called content provider i, and U is the number of client devices that received log requests from data processing system.

The data processing system can determine a call conversion rate for the content item based on a ratio of a number of the subset of the plurality of client device to a number of the plurality of client device and a multiplicative factor. The multiplicative factor can include, for example, a ratio of the number of the plurality of client device that received a log request to a ratio of the number of plurality of client devices that received a presentation of the content item associated with the content provider. In some implementations, the data processing system can receive a number of presentations of the content item by another plurality of client device'. For example, the data processing system can retrieve the number of presentations of the content item from the database, content provider, or any one or more components of system. The plurality of client device can be a subset of the other plurality of client device'. Using the multiplicative factor, the call conversion ratio, for example, can be in the form:

$$N_i = \frac{Y}{U} * P$$

where $N_i$ is the call conversion rate for content provider i, Y is the number of client device that called content provider i, U is the number of client devices that received log requests from data processing system, and P is the ratio of the number of the plurality of client device that received a log request to a ratio of the number of plurality of client devices that received a presentation of the content item associated with the content provider.

In some implementations, the data processing system can determine that the number of the plurality of client device that transmitted a log response indicating that the phone number of the content provider exists on the call log of the respective client device is below a threshold number. The threshold number can be based on the ratio of the number of the plurality of client device that transmitted a log response indicating that the phone number of the content provider exists on the call log of the respective client device to the number of the plurality of client device that received a log request form the data processing system, the ratio of the number of plurality of client device that transmitted a log response indicating that the phone number of the content provider exists on the call log of the respective client device to the number of the plurality of client device that received a presentation of the content item associated with the content provider, among others. For example, the threshold number can be 15% of the total number of the plurality of client devices that received a presentation of the content item associated with the content provider that transmitted a log response indicating that the phone number of the content provider exists on the call log of the respective client device.

In some implementations, responsive to determining that the number of the plurality of client device that transmitted a log response indicating that the phone number of the content provider exists on the call log of the respective client device is below a threshold number, the data processing system can determine a call conversion rate for the content item based on an approximation function. The parameters of the approximation function can include a number of the plurality client device that transmitted a log response and number of total presentations of the content item associated with the content provider, among others. The approximation function, for example, can be in the form of a minimum norm solution:

$$\min \|\tilde{x}\|_l \text{ such that } \|A\tilde{x}-b\|_l < \in$$

where the double lined brackets denotes a norm function, b is the subset of the plurality of client device that transmitted a log response indicating that either the phone number of the content provider exists or does not exist on the call log of the respective client device, $\tilde{x}$ is the estimate set of the plurality of client device, A is some randomly distributed matrix, and E is some noise measure such as white noise. In this example, the sizes of A and $\tilde{x}$ can be larger than the size of b and be based on the number of total presentations of the content item associated with the content provider to the plurality of client device. The data processing system can generate a randomly distributed matrix A such as a normal distribution and determine a minimum norm solution for $\tilde{x}$ based on $L_P$ norms such $L_1$ norm. Based on the minimum norm solution of $\tilde{x}$, the data processing system can determine an estimate for the call conversion rate for the number of total presentations of the content item associated with the content provider to the plurality of client device.

In some implementations, responsive to determining that the number of the plurality of client device that transmitted a log response indicating that the phone number of the content provider exists on the call log of the respective client device is below a threshold number, the data processing system can determine a call conversion rate for the content item further based on a weight. The weight can be based on a predetermined range of a plurality predetermined ranges, each defined by a ratio or percentage of the number of the plurality of client device that transmitted a log response indicating that the phone number of the content provider exists on the call log of the respective client device to the number of the plurality of client device that received a log request or a ratio or percentage of the number of the plurality of client device that transmitted a log response indicating that the phone number of the content provider exists on the call log of the respective client device to the total number of presentations of the content item associated with the content provider to the plurality of client device, among others. For example, the weight to apply to the call conversion rate can be 4.7 if the percentage between the number of the plurality of client device that transmitted a log response indicating that the phone number of the content provider exists on the call log of the respective client device to the total number of presentations of the content item associated with the content provider to the plurality of client device is between 1.5-1.7%, but be 3.2 if the ratio is 1.7-2.5%. The weights to apply to the call conversion rate can also be based on previous empirical measurements of the call conversion rate for content associated with other content providers. Based on the weights and the predetermined ranges, The call conversion rate can be, for example, of the form:

$$N_i = \alpha \frac{Y}{U}$$

$$\alpha \triangleq \begin{cases} 8.5 & r < 0.05 \\ 4.4 & 0.05 \leq r < 0.3 \\ 1.6 & r \geq 0.3 \end{cases}$$

where $N_i$ is the call conversion rate for content provider i, Y is the number of client device that called content provider i, U is the number of client devices that received log requests from data processing system, a is the weighted to apply to the call conversion rate, and r is the ratio of the number of the plurality of client device that transmitted a log response indicating that the phone number of the content provider exists on the call log of the respective client device to the number of the plurality of client device that received a log request.

Figure 5:
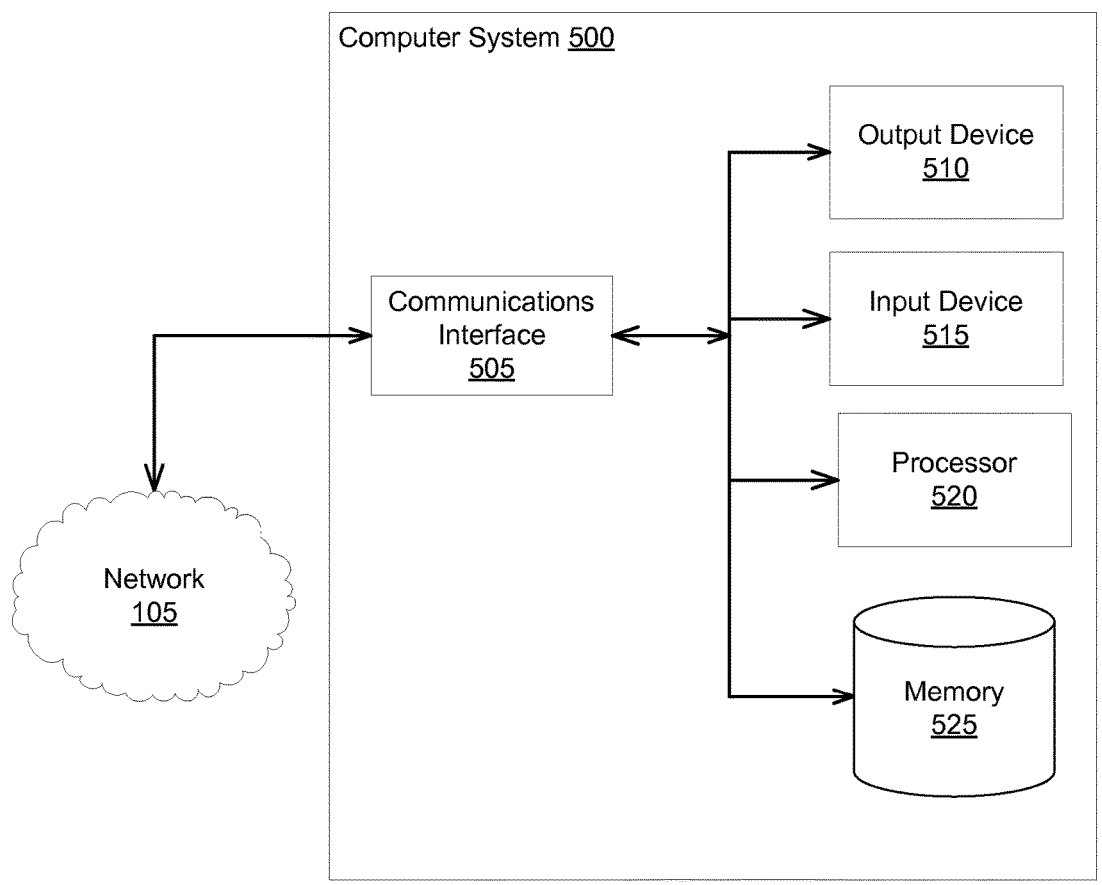
FIG. 5 is a block diagram illustrating a general architecture for a computer system that may be employed to implement elements of the systems and methods described and illustrated herein, according to an illustrative implementation.

FIG. 5 shows the general architecture of an illustrative computer system 500 that may be employed to implement any of the computer systems discussed herein (including the system 110 and its components such as the bandwidth detection module 130, the script provider module 135 and the content package provider module 140) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the bandwidth detection module 130, the script provider module 135 and the content package provider module 140.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 525 to store information related to the availability of inventory of one or more content units, reservations of one or more content units, among others. The memory 525 can include the database 135. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 50. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 50.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The bandwidth detection module 130, the script provider module 135 and the content package provider module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the bandwidth detection module 130, the script provider module 135 and the content package provider module 140 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to providing interactive content for display, the systems and methods described herein can include applied to other environments in which data included in a log database used and compared to data corresponding to previous requests for content and responsive to determining a change in the data, identifying one or more content items to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of estimating call conversions using call log data, comprising:

receiving a first account identifier from a first client device of a first plurality of client devices;

receiving, by a conversion tracker executed by one or more processors of a data processing system, an identification of a first conversion event by a second client device at a first time and a second account identifier, the identification of the first conversion event transmitted in response to the second client device rendering a first instance of a content item associated with a content provider and a phone number of the content provider;

determining, responsive to receiving the identification of the first conversion event, that the second client device is associated with the first client device based on the first account identifier and the second account identifier;

determining, based on determining that the second client device is associated with the first client device, to transmit a first log request to the first client device;

transmitting, by the conversion tracker to the first client device at a first request time and based on determining that the second account identifier is associated with the first account identifier, the first log request comprising an identification of the phone number of the content provider;

receiving, by the conversion tracker from the first client device, a first log response indicating that the phone number of the content provider does not exist in a call log of the first client device;

subsequently receiving, by the conversion tracker, an identification of a second conversion event by the second client device at a second time, the identification of the second conversion event transmitted in response to the second client device rendering a second instance of the content item associated with the content provider and the phone number of the content provider;

transmitting, by the conversion tracker to the first client device at a second request time and responsive to receiving the identification of the second conversion event, a second log request comprising the identification of the phone number of the content provider;

receiving, by the conversion tracker from the first client device, a second log response indicating that the phone number of the content provider exists in the call log of the first client device; and identifying, by the conversion tracker, a time window in which the first client device called the phone number of the content provider based at least on a difference between the first request time of the first log request and the second request time of the second log request.

2. The method of claim 1, further comprising:

transmitting, by the conversion tracker to each of the first plurality of client devices, a log request comprising the identification of the phone number of the content provider, responsive to receiving the identification of a conversion event associated with the content item from said client device; and receiving, by the conversion tracker from each of a subset of the first plurality of client devices, a log response indicating that the phone number of the content provider exists in a call log of the said client device.

3. The method of claim 2, further comprising determining, by the conversion tracker, a call conversion rate for the content item based on a ratio of a number of the subset of the first plurality of client devices to a number of the first plurality of client devices.

4. The method of claim 3, further comprising receiving, by the conversion tracker, a number of presentations of the content item by a second plurality of client devices, the first plurality of client devices a subset of the second plurality of client devices; and wherein determining the call conversion rate further comprises determining the call conversion rate based on a ratio of the number of the first plurality of client devices to a number of the second plurality of client devices.

5. The method of claim 2, further comprising:

determining, by the conversion tracker, that a number of the subset of the first plurality of the client devices is below a threshold number; and determining, responsive to determining that the number of the subset of the first plurality of the client devices is below the threshold number, by the conversion tracker, a call conversion rate for the content item based on an approximation function of the number of the subset of the first plurality of the client devices and a number of total presentations of the content item.

6. The method of claim 1, wherein the first log response and second log response do not include the phone number.

7. The method of claim 6, wherein the first log response consists essentially of a negative identifier, and wherein the second log response consists essentially of a positive identifier.

8. A system for estimating call conversions using call log data, comprising:

a computing device comprising a processor and network interface in communication with a first plurality of client devices, the processor configured to execute a conversion tracker;

wherein the conversion tracker is configured to:

receive a first account identifier from a first client device of the first plurality of client devices;

receive, from a second client device of the first plurality of client devices, a second account identifier and an identification of a first conversion event at a first time, the identification of the first conversion event transmitted in response to the second client device rendering a first instance of a content item associated with a content provider and a phone number of the content provider, determine, responsive to receiving the identification of the first conversion event, that the second client device is associated with the first client device based on the first account identifier and the second account identifier, determine, based on determining that the second client device is associated with the first client device, to transmit a first log request to the first client device;

transmit, to the first client device at a first request time and based on determining that the second account identifier is associated with the first account identifier, the first log request comprising an identification of the phone number of the content provider, responsive to receiving the identification of the first conversion event, receive, from the first client device, a first log response indicating that the phone number of the content provider does not exist in a call log of the first client device, subsequently receive an identification of a second conversion event by the second client device at a second time, the identification of the second conversion event transmitted in response to the second client device rendering a second instance of the content item associated with the content provider and the phone number of the content provider, transmit, to the first client device at a second request time, a second log request comprising an identification of the phone number of the content provider, responsive to receiving the identification of the second conversion event, receive, from the first client device, a second log response indicating that the phone number of the content provider exists in the call log of the first client device, and identify a time window in which the first client device called the phone number of the content provider based on a difference between the first request time of the first log request and the second request time of the second log request.

9. The system of claim 8, wherein the conversion tracker is further configured to:

receive from the first client device an indication that access to the call log of the first client device is allowed; and transmit the first log request, responsive to receiving the indication that access to the call log of the first client device is allowed.

10. The system of claim 8, wherein the conversion tracker is further configured to receive an identification of a conversion event associated with the content item from each of the first plurality of client devices; and transmit to each of the first plurality of client devices a log request comprising an identification of the phone number of the content provider, responsive to receiving the identification of the conversion event associated with the content item from said client device.

11. The system of claim 10, wherein the conversion tracker is further configured to:

receive, from each of a subset of the first plurality of client devices, a log response indicating that the phone number of the content provider exists in a call log of the said client device; and determine a call conversion rate for the content item based on a ratio of a number of the subset of the first plurality of client devices to a number of the first plurality of client devices.

12. The system of claim 11, wherein the conversion tracker is further configured to:

receive a number of presentations of the content item by a second plurality of client devices, the first plurality of client devices a subset of the second plurality of client devices; and determine the call conversion rate based on a ratio of the number of the first plurality of client devices to a number of the second plurality of client devices.

13. The system of claim 11, wherein the conversion tracker is further configured to determine that a number of the subset of the first plurality of client devices is below a threshold and, responsive to determining that the number of the subset of the first plurality of client devices is below the threshold, determines a call conversion rate for the content item based on an approximation function of the number of the subset of the first plurality of client devices and a number of total presentations of the content item.

14. The system of claim 11, wherein the conversion tracker is further configured to determine the call conversion rate based on a weighted ratio of a number of the subset of the first plurality of client devices to a number of the first plurality of client devices, the weighted ratio based on a predetermined range, of a plurality of predetermined ranges, including the number of the subset of the first plurality of client devices.

* * * * *